United States Patent [11] 3,627,693

| [72] | Inventor | Joseph A. Scarpelli |
| | | Dayton, Ohio |
| [21] | Appl. No. | 6,583 |
| [22] | Filed | Jan. 28, 1970 |
| [45] | Patented | Dec. 14, 1971 |
| [73] | Assignee | The National Cash Register Company |
| | | Dayton, Ohio |

[54] LAYERED CAPSULE WALLS AND A METHOD FOR MANUFACTURING THEM
7 Claims, No Drawings

[52] U.S. Cl. .................................................. 252/316,
71/64 A, 99/166, 106/308 P, 117/81, 117/100 A,
117/100 B, 117/100 C, 264/4, 424/33, 424/37
[51] Int. Cl. .......................................................... B01j 13/02,
B44d 1/16
[50] Field of Search ............................................. 252/316;
117/100 A; 264/4; 424/33, 37

[56] References Cited
UNITED STATES PATENTS

| 2,581,038 | 1/1952 | Middendorf .................. | 424/33 |
| 2,969,331 | 1/1961 | Brynko et al. ................. | 252/316 |
| 2,980,941 | 4/1961 | Miller ............................ | 252/316 X |
| 3,043,782 | 7/1962 | Jensen .......................... | 252/316 |
| 3,328,257 | 6/1967 | Vrancken et al. ............. | 252/316 X |

*Primary Examiner*—Richard D. Lovering
*Attorneys*—E. Frank McKinney and Robert J. Shafer ABSTRACT: A process is disclosed for performing encapsulation, en masse, in an aqueous liquid vehicle, wherein two kinds of hydrophilic polymeric material are sequentially deposited from solution onto particles of intended capsule core entities. The two kinds of hydrophilic polymeric wall materials, while individually and sequentially deposited from solution by liquid-liquid phase separation, also yield a middle-zone wherein the two kinds of material are present in a mixed combination. A preferred capsule product of this disclosed process comprises: substantially water insoluble capsule core material; polyvinyl alcohol inner capsule wall material; polyvinyl alcohol-gelatin middle-zone wall; and gelatin outer capsule wall material.

LAYERED CAPSULE WALLS AND A METHOD FOR MANUFACTURING THEM

BACKGROUND OF THE INVENTION

1. Field of the Invention

The present invention pertains to a minute capsule containing substantially water insoluble capsule core material and having seamless walls of two kinds of hydrophilic polymeric material. It further pertains to such a capsule wherein the two capsule wall materials are present in a stratified construction of three layers, viz, inner wall of a first material, outer wall of a second material and middle-zone of a mixture of the two materials. The invention more specifically pertains to such a capsule wherein the polymeric material of the inner capsule wall is relatively electrically uncharged and wherein the polymeric material of the outer capsule wall is an amphoteric colloid material exhibiting a specific isoelectric point in aqueous solution. The invention, more specifically and in a preferred embodiment, pertains to such a capsule wherein the inner capsule wall material is polyvinyl alcohol and wherein the outer capsule wall material is gelatin.

The present invention relates to a process for manufacturing capsules described in the paragraph above, en masse, by means of sequential liquid-liquid phase separation of the two hydrophilic polymeric capsule wall materials from solution in an aqueous capsule manufacturing vehicle. It further relates to such a process wherein one capsule wall material is caused to undergo phase separation by addition, to the system, of a substantially neutral water-soluble salt and wherein another capsule wall material is caused to undergo phase separation by alteration of the pH of the system. It further, and more specifically relates to such a system wherein polyvinyl alcohol—an inner capsule wall material—is phase-separated by addition of the substantially neutral salt and wherein gelatin—an outer capsule wall material—is phase-separated by alteration of the pH of the system.

2. Description of the Prior Art

U.S. Pat. No. 3,265,629, issued Aug. 9, 1966, on the application of E. H. Jensen discloses capsules having dual walls, i.e., capsules having an inner wall and an outer wall. In that patent, however, the inner capsule wall is of a waxy material and the outer capsule wall is of a hydrophilic nature. The two walls form distinct layers and are not significantly intercombined. The encapsulation disclosed in that patent is accomplished by two individual and distinct coating processes—one for the waxy coating and another for the hydrophilic polymeric material.

U.S. Pat. No. 2,99,331, issued Jan. 24, 1961, on the application of Carl Brynko and Joseph A. Scarpelli and assigned to the assignee herein discloses a dual-walled capsule wherein the outer capsule wall is a hydrophilic polymeric material deposited by liquid-liquid phase separation and the inner capsule wall is produced, in situ, within the capsule by spontaneous polymerization of monomeric material initially dissolved in the internal phase thereof. The inner capsule wall material of that patent is not hydrophilic and there are two distinct capsule wall layers with no combination or intermixing of the material of the individual layers. The individual capsule wall layers are produced and deposited by different mechanisms in distinct processes.

U.S. Pat. No. 3,190,87, issued June 22, 1965, on the application of Carl Brynko and Joseph A. Scarpelli and assigned to the assignee herein discloses a capsule having multiple layers of hydrophilic polymeric material in the walls wherein the individual layers are, to some degree, intermixed in their deposition. In that patent, however, the material of one layer of the capsule wall differs from material of another layer merely in molecular weight and the material of all of the layers is hydrophilic polymeric material having electrical charges.

U.S. Pat. application, Ser. No. 701,128, filed Jan. 29, 1968, in the name of Robert G. Bayless and assigned to the assignee herein, discloses capsules having walls of polyvinyl alcohol material and a process for making those capsules. There is no mention of more than a single capsule wall layer and the process for depositing the polyvinyl alcohol capsule wall material requires that it be complexed with another compound.

Gelatin capsule wall material is well known in the prior art;—it being discussed, for example, in U.S. Pat. No. 2,80,457, issued July 23, 1957, on the application of Barrett Green and Lowell Schleicher.

SUMMARY OF THE INVENTION

Minute capsules manufactured, en masse, from a liquid vehicle and having but a single-layer capsule wall material are, in some instances, limited with respect to utility. For example, some materials desired to be contained in minute capsules are reactive with chemical groups on gelatine and cannot, therefore, be successfully contained within gelatin capsule walls. On the other hand, gelatin is a very effective capsule wall material with regard to impermeability to diffusion of capsule contents and gelatin also provides a water soluble or meltable capsule wall in the absence of gelatin cross-linking materials. Polyvinyl alcohol is a hydrophilic polymeric material eligible for use as capsule wall material in the present invention. Polyvinyl alcohol has, in some instances in the past, been difficult to use in an en masse manufacture of capsules from a liquid vehicle due to a tendency for individual capsules to be aggregated together during the manufacturing process. Polyvinyl alcohol does, however, exhibit desirable capsule wall characteristics with respect to impermeability to diffusion, cold water solubility and relative inertness toward reaction with many capsule internal phase materials.

A capsule wall comprising layers of different polymeric materials exhibits desirable characteristics from each of the different polymeric constituents. Also, a capsule wall layer which comprises an intermixed combination of different polymeric materials may exhibit a total of benefits equal to greater than the sum of individual benefits offered by the polymeric materials taken one at a time.

Accordingly, it is an object of the present invention to provide a method for manufacturing capsules having walls of two different hydrophilic polymeric capsule wall materials. It is a further object to provide such a process for manufacturing capsules wherein the two hydrophilic polymeric materials are present as individual layers of the capsule wall. It is a more specific object to provide such a process with layered walls wherein the two layers have present between them a "zone" or additional layer of an intermixture of the two polymeric materials. It is a specific object of the present invention to provide a method for manufacturing two-layer capsule walls by a sequence of liquid-liquid phase separation operations wherein there is an inner layer, an intermixed layer, and an outer layer comprising two different capsule wall materials.

It is an object of the present invention to provide a capsule manufactured according to the novel process wherein the capsule has walls with properties improved over those of the prior art. It is a further object to provide capsules having a layered capsule wall structure. It is a specific further object to provide such a capsule having walls of an inner layer of one capsule wall material, an outer layer of another capsule wall material and a layer or zone between, of an intermixture of the two polymeric materials;—the intermixture ranging, in composition, from highly concentrated in inner layer material on its inner side to highly concentrated in outer layer material on its outer side.

It is a particular and specific object of the present invention to provide capsules having walls deposited in layers wherein an inner layer is polyvinyl alcohol, an outer layer is gelatin and a layer between the inner and outer layers is an intermixed combination of polyvinyl alcohol and gelatin. It is also a particular and specific object of the present invention to provide a process for manufacturing such capsules.

The process of the present invention, in generalized terms, includes the following:

a. establishing a liquid capsule manufacturing system having two polymeric capsule wall materials in solution;

b. dispersing intended capsule core material into the system;

c. altering the system in one manner to cause the first of the two polymeric materials to undergo liquid-liquid phase separation and deposit as an inner layer onto entities of the capsule core material to yield embryonic capsules;

d. altering the system in another manner to cause the second of the two polymeric materials to undergo liquid-liquid phase separation and deposit as an outer layer onto the embryonic capsules; and e. solidifying and hardening the deposited polymeric material, thereby yielding capsules having solid walls of layered polymeric material. It should be noted, again, that a zone of intermixed polymeric materials exists between the above-described inner and outer layers.

The capsule manufacturing vehicle of the present invention is aqueous and the capsule wall polymeric materials are hydrophilic polymeric materials. In general, one of the capsule wall polymers is electrically charged and exhibits an isoelectric point. Among polymeric materials specifically eligible for use in the present invention is included polyvinyl alcohol.

The term "polyvinyl alcohol" as used herein is to be understood as referring to polymeric material in which at least 50 percent, by weight, thereof is composed of vinyl alcohol constituent. The term refers to polymeric materials, all of which are composed of vinyl alcohol constituents and also to polymeric material containing not only vinyl alcohol constituents but also vinyl acetate (and/or propionate and/or butyrate) constituents providing that the vinyl alcohol constituents make up at least 50 percent, by weight, of the polymeric material. The polyvinyl alcohol most often used in practice of this invention is any commercial variety and is the hydrolysis product of polyvinyl acetate. Polyvinyl alcohol representing polyvinyl acetate which has been hydrolyzed to an extent of 75 to 99 or more percent, by weight, is preferably used, although polyvinyl alcohol having a lower degree of hydrolysis can be used.

Other polymeric materials eligible for use in the present invention include gelatins of several types including acid- and alkali-precursor animal gelatins, both of the unmodified type and of the type which has been chemically altered. An example of chemically altered gelatin is succinylated calfskin gelatin. Preferred polymeric materials used herein are gelable in the separated liquid phase by lowering the temperature of the material.

In the preferred practice of the present invention, polyvinyl alcohol is the first material to be separated from solution. Such phase separation is accomplished by addition of a phase-separation-inducing salt to the encapsulating system. Salts eligible for inducing phase separation include water soluble inorganic compounds well known as being phase separation inducers. Examples of such materials include, for example, ammonium, sodium, and magnesium salts of sulfate, citrate, acetate or chloride. Criteria for selection of a phase separating salt are: adequate water solubility; and chemical inertness with other components of the capsule-manufacturing system. After phase separation of the polyvinyl alcohol by addition of a salt, gelatin is caused to be phase separated by adjustment of the pH of the system. The pH is adjusted by addition of an appropriate acid or base such as sulfuric acid or sodium hydroxide. Phase separation of the gelatin is generally accomplished by adjusting the pH in the direction of the isoelectric point.

After deposition of both kinds of polymeric capsule wall material, the polymeric material can be solidified or gelled by reducing the temperature of the system. The gelled polymeric materials can also be chemically hardened, if desired or required for a particular purpose. Such hardening can be selected to occur in one or both of the capsule wall layers. Examples of chemical hardening or cross-linking agents include; aldehydes, borates, transition metal salts and the like.

Material contained by capsule walls of olive invention, i.e., the capsular internal phase or capsule core material, is relatively unimportant to the practice of the invention and can be any material which is substantially water-insoluble and which does not interact with the intended capsule wall material, or with other encapsulating system components, to the detriment of the novel process. A few of the materials which can be utilized as capsule internal phases include, among a multitude of others: water-insoluble or substantially water-insoluble liquids, such as oilve oil, fish oils, vegetable oils, sperm oil, mineral oil, xylene, toluene, kerosene, chlorinated biphenyl, methyl salicylate; water-insoluble metallic oxides and salts; fibrous materials, such as cellulose or asbestos; water-insoluble synthetic polymeric materials; minerals; pigments; glasses; elemental materials including solids, liquids and gases; flavors; fragrances; reactants; biocidal compositions; physiological compositions; fertilizer compositions; and the like.

Capsules of the present invention are minute and substantially spherical. The capsules can range in size from only a few microns to several thousand microns in average diameter;— the preferred size range being from about 100 microns to about 1,000 microns in diameter, with the most preferred range being from about 300 microns to about 1,000 microns.

The capsules may contain from less than 50 to more than 95 percent, by weight, internal phase material as required or desired for particular capsule uses. Relative amounts of each of the two capsule wall materials can be varied, as desired, for particular results. Ratios of gelatin-to-polyvinyl alcohol of from about 1-to-1 up to about 3-to-1, by weight, are preferred for use in the process as it is now practiced. The preferred ratios can, of course, be altered without falling outside the ambit of the present invention.

With the above objects and considerations in mind, there follows a specific description of preferred embodiments of the invention. Teachings of the invention are clearly demonstrated therein and further objects will become apparent to those skilled in the art in possession of this disclosure.

DESCRIPTION OF PREFERRED EMBODIMENTS

Example I

In this example, an organic liquid solvent will be encapsulated according to the novel process.

An aqueous solution of polyvinyl alcohol is prepared by dissolving 11.5 grams of polyvinyl alcohol in about 220 grams of water. The polyvinyl alcohol 88–of a kind being about 88–89 percent hydrolyzed polyvinyl acetate and having a viscosity of about 4–6 centipoises in 4 percent, by weight, aqueous solution at 20° C., and a molecular weight of approximately 3,000. An example of such a polyvinyl alcohol is that material bearing the trademark "Elvanol 51–05" sold by E. I du Pont de Nemours & Co., Ic., Wimington, Delaware, United States of America.

To the above-prepared 5 percent, by weight, aqueous polyvinyl alcohol solution, is added 20 grams of succinylated gelatin and the resulting system is agitated until the gelatin is dissolved. An example of succinylated gelatin eligible for use in this example is the material bearing the trademark "Type 2001" as sold by Kind and Knox Gelatin Company, Camden, New Jersey, United States of America.

A capsule manufacturing vehicle is, thus, microns comprising an aqueous solution having a volume of approximately 250 milliliters and including polyvinyl alcohol and gelatin. One hundred milliliters of cleaners'naphtha, a substantially water insoluble and relatively low-boiling petroleum distillate (approximately 175° C. to attain 50 percent distillation) are added into the agitating capsule manufacturing vehicle and the agitation is adjusted to yield dispersed naphtha droplets having the size of about 300–500 microns in diameter.

The system is warmed to about 50° C. and the pH is adjusted to about 4.9. At this point, no phase separation of capsule wall material has occurred. To this system is slowly added 100 milliliters of 20 percent, by weight, aqueous solution of sodium sulfate. In this example, sodium sulfate is a liquid-liquid phase-separation-inducing agent; and after addition of the sodium sulfate, a separated liquid phase is present which is concentrated in polyvinyl alcohol and which encases the individual, naphtha droplets. The system now contains embryonic capsules with a single liquid capsule wall layer rich in phase separated polyvinyl alcohol but also containing a small amount of the gelatin which has also been phase separated.

Next, the pH of the system is slowly adjusted to 4.3 and the gelatin emerges from solution as an additional liquid phase which encases the already-formed embryonic capsules. During the course of the pH change, a decreasing amount of polyvinyl alcohol separates from solution and an increasing amount of gelatin emerges to yield, at the end, a two-layer liquid capsule wall having an inner layer wall of polyvinyl alcohol, an outer layer wall of gelatin and a "zone" between the layers of intermixed polyvinyl alcohol and gelatin.

To solidify the layered capsule wall, the agitating system is cooled; and, if desired, the capsule wall materials can be chemically hardened by addition of cross-linking agents such as aldehydes (e.g., formaldehyde, glutaraldehyde), transition metal salts (.g., vanadates, chromates), borate salts, and the like.

Example II

The above, example I, is repeated with the exception that acid-extracted porkskin gelatin having a Bloom strength of about 285–305 grams and an isoelectric point of about pH 8 to 9 is substituted for the succinylated gelatin used therein.

The finally adjusted pH of the system in this example is higher than that of example I, that is, the pH is adjusted toward the isoelectric point of the gelatin.

Example III

The following are combined in a toluene of appropriate size: 15 grams of gelatin as specified in example II, above; 7.5 grams of polyvinyl alcohol as specified in example I, above; 150 grams of water; and 50 grams of toluene. The combination of materials is warmed to about 50° C. under forces of agitation and the agitation is continued until the polyvinyl alcohol and gelatin are completely dissolved and the tolene is dispersed to yield droplets about 500–1,000 microns in diameter.

One hundred ten grams of a 20 percent, by weight, aqueous sodium sulfate solution are slowly added to the vessel and the polyvinyl alcohol emerges from solution to yield embryonic, single layer, capsule walls. The pH of the system (initially at about 4–4.5) is then increased to cause phase separation of the gelatin and subsequent deposition of the gelatin onto the already deposited polyvinyl alcohol and polyvinyl alcohol/gelatin capsule wall.

What is claimed is:

1. A minute, substantially spherical, capsule having an internal phase of substantially water insoluble material and having a capsule wall material comprising an inner layer of polyvinyl alcohol, an outer layer of gelatin and a zone between the two layers of an intermixture of polyvinyl alcohol and gelatin.

2. The capsule of claim 1 wherein the gelatin and polyvinyl alcohol are present in weight ratios of about 1-to-1 to about 3-to-1, respectively.

3. A process for manufacturing minute capsules having capsule walls of layers of different polymeric material compositions comprising the steps of:
    a. establishing an agitating two-phase system of a continuous phase of an aqueous liquid solution including polyvinyl alcohol and gelatin having an isoelectric point and a discontinuous phase of intended capsule core entities substantially insoluble in the continuous phase;
    b. adding a phase-separation-inducing salt to the system to cause liquid-liquid phase separation of a major portion of the polyvinyl alcohol which polyvinyl alcohol deposits as an inner layer onto the capsule core entities to yield embryonic capsules;
    c. adjusting the pH in the direction of the isoelectric point of the gelatin to cause liquid-liquid phase separation of a major portion of the gelatin which gelatin deposits as an outer layer onto the embryonic capsules; and
    d. solidifying the deposited polymeric materials.

4. A process for manufacturing minute capsules having capsule walls of layers of two different polymeric materials comprising the steps of:
    a. establishing an agitating two-phase system of a continuous phase of an aqueous liquid solution including polyvinyl alcohol and gelatin having an isoelectric point as the two polymeric materials and a discontinuous phase of intended capsule core entities;
    b. altering conditions of the system by adding a phase-separation-inducing salt and by adjusting the pH in the direction of the isoelectric point of the gelatin to cause sequential liquid-liquid phase separation of one of the polymeric materials and then the second of the polymeric materials which polymeric materials, as they emerge from solution, deposit as liquid embryonic capsule wall material layers onto the intended capsule core entities; and
    c. solidifying the liquid embryonic capsule wall material.

5. The process of claim 4 wherein there is the additional step of:
    d. hardening the solidified capsule wall material.

6. A process for manufacturing minute capsules, en masse, comprising the steps of:
    a. establishing an aqueous liquid capsule manufacturing system having polyvinyl alcohol and gelatin with an isoelectric point as capsule wall materials dissolved therein;
    b. dispersing substantially water insoluble capsule core material into the system;
    c. adding a phase-separation-inducing salt to the system to cause liquid-liquid phase separation of a major portion of the polyvinyl alcohol which, on the occasion of phase separation, deposits as an inner layer onto entities of the capsule core material to yield embryonic capsules;
    d. adjusting the pH in the direction of the isoelectric point of the gelatin to cause liquid-liquid phase separation of a major portion of the gelatin which, on the occasion of phase separation, deposits as an outer layer onto the embryonic capsules; and
    e. solidifying the deposited polymeric material.

7. The process of claim 6 wherein there is the additional step of:
    f. hardening the solidified polymeric material.

* * * * *